US00RE41531E

(19) United States
(12) Reissued Patent
Wood, Jr.

(10) Patent Number: US RE41,531 E
(45) **Date of Reissued Patent: *Aug. 17, 2010**

(54) COMMUNICATIONS SYSTEMS FOR RADIO FREQUENCY IDENTIFICATION (RFID)

(75) Inventor: Clifton W. Wood, Jr., Tulsa, OK (US)
(73) Assignee: Round Rock Research, LLC, Mount Kisco, NY (US)

( * ) Notice: This patent is subject to a terminal disclaimer.

(21) Appl. No.: 11/859,364

(22) Filed: Sep. 21, 2007

Related U.S. Patent Documents

Reissue of:
(64) Patent No.: 6,307,847
Issued: Oct. 23, 2001
Appl. No.: 09/617,390
Filed: Jul. 17, 2000

U.S. Applications:

(63) Continuation of application No. 10/693,697, filed on Oct. 23, 2003, which is a continuation of application No. 09/026,043, filed on Feb. 19, 1998, now Pat. No. 6,118,789.

(51) Int. Cl.
*H04W 4/00* (2006.01)

(52) U.S. Cl. ..... 370/329; 370/346; 370/347
(58) Field of Classification Search ..... 370/329, 370/346, 347, 462, 408, 230, 437, 441, 442, 370/449, 458, 463, 342, 345, 348
See application file for complete search history.

(56) References Cited

U.S. PATENT DOCUMENTS 4,075,632 A 2/1978 Baldwin et al.

(Continued)

FOREIGN PATENT DOCUMENTS

EP 779520 9/1997

(Continued)

OTHER PUBLICATIONS

Auto–ID Center, Massachusetts Institute of Technology, "13.56 MHz ISM Band Class 1 Radio Frequency Identification Tag Interface Specification: Recommended Standard," Technical Report, Feb. 1, 2003.

(Continued)

*Primary Examiner*—Brian D Nguyen
(74) *Attorney, Agent, or Firm*—Gazdzinski & Associates, PC

(57) ABSTRACT

A [method of] *system for* establishing wireless communications between an interrogator and individual ones of multiple wireless identification devices[, the method comprising utilizing a tree search method to establish communications without collision between the interrogator and individual ones of the multiple wireless identification devices, a search tree being defined for the tree search method, the tree having multiple levels respectively representing subgroups of the multiple wireless identification devices, the method further comprising starting the tree search at a selectable level of the search tree. A communications system comprising an interrogator, and a plurality of wireless identification devices configured to communicate with the interrogator in a wireless fashion, the respective wireless identification devices having a unique identification number, the interrogator being configured to employ a tree search technique to determine the unique identification numbers of the different wireless identification devices so as to be able to establish communications between the interrogator and individual ones of the multiple wireless identification devices without collision by multiple wireless identification devices attempting to respond to the interrogator at the same time, wherein the interrogator is configured to start the tree search at a selectable level of the searched tree.] *The interrogator transmits a first request comprising a bit string comprising a plurality of bits for use in selecting one or more wireless identification devices to participate in a slotted anticollision algorithm. Wireless identification devices in a field of the interrogator use the bit string to determine whether or not they are selected for participation. Those wireless identification devices that are selected for participation respond to the interrogator in a slot with a certain probability in accordance with the slotted anticollision algorithm.*

41 Claims, 3 Drawing Sheets

U.S. PATENT DOCUMENTS

| | | | |
|---|---|---|---|
| 4,761,778 | A | 8/1988 | Hui |
| 4,796,023 | A | 1/1989 | King |
| 4,799,059 | A | 1/1989 | Grindahl et al. |
| 4,845,504 | A | 7/1989 | Roberts et al. |
| 4,862,453 | A | 8/1989 | West et al. |
| 4,926,182 | A | 5/1990 | Ohta et al. |
| 4,955,018 | A | 9/1990 | Twitty et al. |
| 4,969,146 | A | 11/1990 | Twitty et al. |
| 5,019,813 | A | 5/1991 | Kip et al. |
| 5,025,486 | A | 6/1991 | Klughart |
| 5,046,066 | A | 9/1991 | Messenger |
| 5,055,968 | A | 10/1991 | Nishi et al. |
| 5,121,407 | A | 6/1992 | Partyka et al. |
| 5,124,697 | A | 6/1992 | Moore |
| 5,142,694 | A | 8/1992 | Jackson et al. |
| 5,144,313 | A | 9/1992 | Kirknes |
| 5,144,668 | A | 9/1992 | Malek et al. |
| 5,150,114 | A | 9/1992 | Johansson |
| 5,150,310 | A | 9/1992 | Greenspun et al. |
| 5,164,985 | A | 11/1992 | Nysen et al. |
| 5,168,510 | A | 12/1992 | Hill |
| 5,194,860 | A | 3/1993 | Jones et al. |
| 5,231,646 | A | 7/1993 | Heath et al. |
| 5,266,925 | A | 11/1993 | Vercellotti et al. |
| 5,307,463 | A | 4/1994 | Hyatt et al. |
| 5,365,551 | A | 11/1994 | Snodgrass et al. |
| 5,373,503 | A | 12/1994 | Chen |
| 5,449,296 | A | 9/1995 | Jacobsen et al. |
| 5,461,627 | A | 10/1995 | Rypinski |
| 5,479,416 | A | 12/1995 | Snodgrass et al. |
| 5,500,650 | A | 3/1996 | Snodgrass et al. |
| 5,530,702 | A | 6/1996 | Palmer et al. |
| 5,550,547 | A | 8/1996 | Chan et al. |
| 5,583,850 | A | 12/1996 | Snodgrass et al. |
| 5,608,739 | A | 3/1997 | Snodgrass et al. |
| 5,619,648 | A | 4/1997 | Canale et al. |
| 5,621,412 | A | 4/1997 | Sharpe et al. |
| 5,625,628 | A | 4/1997 | Heath |
| 5,627,544 | A | 5/1997 | Snodgrass et al. |
| 5,640,151 | A | 6/1997 | Reis et al. |
| 5,649,296 | A | 7/1997 | MacLellan et al. |
| 5,686,902 | A | 11/1997 | Reis et al. |
| 5,790,946 | A | 8/1998 | Rotzoll |
| 5,805,586 | A | 9/1998 | Perreault et al. |
| 5,841,770 | A | 11/1998 | Snodgrass et al. |
| 5,914,671 | A | 6/1999 | Tuttle |
| 5,936,560 | A | 8/1999 | Higuchi |
| 5,940,006 | A | 8/1999 | MacLellan et al. |
| 5,942,987 | A | 8/1999 | Heinrich et al. |
| 5,952,922 | A | 9/1999 | Shober |
| 5,966,471 | A | 10/1999 | Fisher et al. |
| 5,974,078 | A | 10/1999 | Tuttle et al. |
| 5,988,510 | A | 11/1999 | Tuttle et al. |
| 6,038,455 | A | 3/2000 | Gardner et al. |
| 6,061,344 | A | 5/2000 | Wood, Jr. |
| 6,072,801 | A | 6/2000 | Wood, Jr. et al. |
| 6,075,973 | A | 6/2000 | Greeff et al. |
| 6,097,292 | A | 8/2000 | Kelly et al. |
| 6,104,333 | A | 8/2000 | Wood, Jr. |
| 6,118,789 | A | 9/2000 | Wood, Jr. |
| 6,130,602 | A | 10/2000 | O'Toole et al. |
| 6,130,623 | A | 10/2000 | MacLellan et al. |
| 6,150,921 | A | 11/2000 | Werb et al. |
| 6,157,633 | A | 12/2000 | Wright |
| 6,169,474 | B1 | 1/2001 | Greeff et al. |
| 6,177,858 | B1 | 1/2001 | Raimbault et al. |
| 6,185,307 | B1 | 2/2001 | Johnson, Jr. |
| 6,192,222 | B1 | 2/2001 | Greeff et al. |
| 6,216,132 | B1 | 4/2001 | Chandra et al. |
| 6,226,300 | B1 | 5/2001 | Hush et al. |
| 6,229,987 | B1 | 5/2001 | Greeff et al. |
| 6,243,012 | B1 * | 6/2001 | Shober et al. ..... 340/572.7 |
| 6,265,962 | B1 | 7/2001 | Black et al. |
| 6,265,963 | B1 | 7/2001 | Wood, Jr. |
| 6,275,476 | B1 | 8/2001 | Wood, Jr. |
| 6,282,186 | B1 | 8/2001 | Wood, Jr. |
| 6,288,629 | B1 * | 9/2001 | Cofino et al. ..... 340/10.1 |
| 6,289,209 | B1 | 9/2001 | Wood, Jr. |
| 6,307,847 | B1 | 10/2001 | Wood, Jr. |
| 6,307,848 | B1 | 10/2001 | Wood, Jr. |
| 6,324,211 | B1 | 11/2001 | Ovard et al. |
| 6,415,439 | B1 | 7/2002 | Randell et al. |
| 6,459,726 | B1 | 10/2002 | Ovard et al. |
| 6,483,427 | B1 | 11/2002 | Werb |
| 6,566,997 | B1 | 5/2003 | Bradin |
| 6,570,487 | B1 | 5/2003 | Steeves |
| 6,707,376 | B1 | 3/2004 | Patterson et al. |
| 6,714,559 | B1 | 3/2004 | Meier |
| 6,771,634 | B1 | 8/2004 | Wright |
| 6,778,096 | B1 * | 8/2004 | Ward et al. ..... 713/1 |
| 6,784,787 | B1 | 8/2004 | Atkins |
| 6,850,510 | B2 | 2/2005 | Kubler et al. |
| 6,919,793 | B2 | 7/2005 | Heinrich et al. |
| 7,026,935 | B2 | 4/2006 | Diorio et al. |
| 7,315,522 | B2 | 1/2008 | Wood, Jr. |
| 7,385,477 | B2 | 6/2008 | O'Toole et al. |
| 7,672,260 | B2 | 3/2010 | Wood, Jr. |
| 2003/0235184 | A1 | 12/2003 | Dorenbosch |
| 2005/0060069 | A1 | 3/2005 | Breed et al. |
| 2005/0207364 | A1 | 9/2005 | Wood, Jr. |
| 2006/0022800 | A1 | 2/2006 | Krishna et al. |
| 2006/0022801 | A1 | 2/2006 | Husak et al. |
| 2006/0022815 | A1 | 2/2006 | Fischer |
| 2006/0056325 | A1 | 3/2006 | Wood, Jr. |
| 2006/0209781 | A1 | 9/2006 | Wood, Jr. |
| 2007/0017651 | A1 | 1/2007 | Cesar et al. |
| 2007/0139164 | A1 | 6/2007 | O'Toole et al. |
| 2008/0007412 | A1 | 1/2008 | Wood, Jr. |
| 2008/0042806 | A1 | 2/2008 | Wood, Jr. |
| 2008/0048832 | A1 | 2/2008 | O'Toole et al. |
| 2008/0048835 | A1 | 2/2008 | O'Toole et al. |
| 2008/0129485 | A1 | 6/2008 | Tuttle |
| 2008/0180221 | A1 | 7/2008 | Tuttle |
| 2009/0322491 | A1 | 12/2009 | Wood, Jr. |

FOREIGN PATENT DOCUMENTS

| | | |
|---|---|---|
| EP | 1072128 | 5/2008 |
| JP | 9054213 | 2/1997 |
| JP | 2002/228809 | 8/2002 |
| WO | WO 97/48216 | * 12/1997 |
| WO | 1997048216 | 12/1997 |
| WO | 1999043127 | 8/1999 |
| WO | 200894728 | 8/2008 |

OTHER PUBLICATIONS

Capetankis, John I., "Generalized TDMA: The Multi–Accessing Tree Protocol," IEEE Transactions on Information Theory, vol. Com. 27, No. 10, pp. 1476–1484, Oct. 1979.

Capetanakis, John I., "Tree Algorithms for Packet Broadcast Channels", IEEE Transactions on Information Theory, vol. IT–25, No. 5, pp. 505–515, Sep. 1979.

CNN Money, "Manhattan Associates Announces Next–Generation Microsoft–Based RFID Solutions," located at http://money.cnn.com/services/ticketheadlines/prn/cltu045.PI.09162003122727.24911.htm, Sep. 16, 2003.

Engels, Daniel, "The Use of the Electronic Product Code," Auto–ID Center, Massachuetts Institute of Technology, Technical Report, Feb. 1, 2003.

EPC Globial, Inc. "EPC Radio Frequency Identify Protocols—Class–1 Generation–2 UHF RFID—Protocol for Communications at 860 MHz–960MHz," version 1.0.9, cover sheet and pp. 37–38, Jan. 2005.
eRetailNews, "The Electronic Product Code (EPC)—A Technology Revolution?" located at http://www.eretailnews.com/features/0105epc1.htm, accessed Oct. 15, 2003.
eRetailNews, "The Electronic Product Code(EPC)," located at http://www.ertailnews.com/features/epc/htm, accessed Oct. 15, 2003.
eRetailNews, "The Electronic Product Code Schematic," located at http://eee.eretailnews.com/features/0105epcschema.htm, accessed Oct. 15, 2003.
Extended Search Report and Search Opinion for EP Patent Application No. 05016513.3, Jan. 22, 2007.
Extended Search Report and Search Opinion for EP Patent Application No. 05016514.1, Jan. 26, 2007.
High Tech Aid, "ISO/IEC 18000—RFID Air Interface Standards," located at http://www.hightechaid.com/standards/18000.htm, Feb. 1, 2003.
Humblet, Pierre A. et al., "Efficient Accessing of a Multiaccess Channel," Proceedings of the 19th IEEE Conference on Decision and Control including the Symposium on Adaptive Processes, pp. 624–627, 1980.
ISO/IEC, "Automatic Identification—Radio Frequency Identification for Item Management—Communications and Interfaces—Part 3: Physical Layer, Anti Collision System and Protocol Values at 13.56 MHz MODE 4," ISO/IEC 18000–3–4, Mar. 1, 2001.
ISO/IEC, "Automatic Identification—Radio Frequency Identification for Item Management—Communications and Interfaces—Part 3: Physical Layer, Anti–Collision and Protocol Values at 13.56 MHz MODE 1," ISO/IEC 18000–3–1, Mar. 1, 2001.
ISO/IEC, "Identification Cards—Contactless Integrated Circuit(s) Cards—Proximity Cards—Part 1: Physical Characteristics," ISO/IEC FCD 14443–1, 1997.
ISO/IEC, "Identification Cards—Contactless Integrated Circuit(s) Cards—Proximity Cards—Part 2: Radio Frequency Power and Signal Interface," ISO/IEC FCD 14443–2, Mar. 26, 1999.
ISO/IEC, "Identification Cards—Contactless Integrated Circuit(s) Cards—Proximity Cards—Part 3: Initiation and Anticollision," ISO/IEC FDIS 14443–3:2000(E), Jul. 13, 2000.
ISO/IEC, "Identification Cards—Contactless Integrated Circuit(s) Cards—Proximity Cards—Part 4: Transmission Protocol," ISO/IEC FDIS 14443–4:2000(E), Jul. 13, 2000.
ISO/IEC, "Identification Cards—Contactless Integrated Circuit(s) Cards—Vicinity Cards—Part 1: Physical Characteristics," ISO/IEC FDIS 15693–1:2000(E), May 19, 2000.
ISO/IEC, "Identification Cards—Contactless Integrated Circuit(s) Cards—Vicinity Cards—Part 2: Interface and Initialization," ISO/IEC FDIS 15693–2:2000(E), Feb. 3, 2000.
ISO/IEC, "Identification Cards—Contactless Integrated Circuit(s) Cards—Vicinity Cards—Part 3: Anticollision and Transmission Protocol," ISO/IEC CD 15693–3:1999(E), Nov. 17, 1999.
ISO/IEC, "Information Technology AIDC Techniques—RFID for Item Management—Air Interface—Part 3: Paramenters for Air Interface Communications at 13:56 MHz," ISO/IEC 18000–3 FCD, May 27, 2002.
Mullin, Eileen, "Electronic Product Code," Baseline Magazine, located at www.baselinemag.com/article2/0,3959,655991,00.asp, Sep. 5, 2002.
RFID Journal, "Second Source of Class 1 EPC Chips," located at http://www.rfidjournal.com/article/articleview/473/1/1/, Jun. 26, 2003.
Wolf, Jack Keil, "Principles of Group Testing and an Application to the Design and Analysis of Multi–Access Protocols," Nato Asi Series E, Applied Sciences, No. 91, pp. 237–257, 1985.
Zebra Technologies Corporation, "Electronic Product Code (EPC)," located at http://www.rfid.zebra.com/epc/htm, accessed Oct. 15, 2003.
Finkenzeller, Klaus, "Radio Frequency Identification—The Authors Homepage of the RFID Handbook," located at http://www.rfid–handbook.com, accessed Feb. 22, 2007.
Smart Active Labels Consortium, organization homepage located at http://www.sal–c.org, accessed Feb. 22, 2007.
Symbol Technologies, Inc., "Understanding Gen 2: What It Is, How You Will Benefit and Criteria for Vendor Assessment," white paper, Jan. 2006.
Wright, Jim, "Trends and Innovations in RF Indentification," Sun Microsystems Inc. presentation, Mar. 2005.
Wood, Jr., Clifton W., U.S. Reissue Appl. No. 10/693,697, filed Oct. 23, 2003.
Wood, Jr., Clifton W., U.S. Reissue Appl. No. 11/865,580, filed Oct. 1, 2007.
Wood, Jr., Clifton W., U.S. Reissue Appl. No. 11/865,584, filed Oct. 1, 2007.
Wood, Jr., Clifton W., U.S. Reissue Pat. Appl. No. 10/652,573, filed Aug. 28, 2008.
Wood, Jr., Clifton W., U.S. Reissue Appl. No. 11/862,121, filed Sep. 26, 2007.
Wood, Jr., Clifton W., U.S. Reissue Appl. No. 11/862,124, filed Sep. 26, 2007.
Wood, Jr., Clifton W., U.S. Reissue Appl. No. 11/862,130, filed Sep. 21, 2007.
International Application No. PCT/US08/50630, Written Opinion, Jun. 27, 2008.
International Application No. PCT/US08/50630, International Search Report, Jun. 27, 2008.
Tuttle, John R., U.S. Appl. No. 11/755,073 entitled "Methods and Systems of Receiving Data Payload of RFID Tags," filed May 30, 2007.
International Application No. PCT/US99/02288, Written Opinion, Jan. 27, 2000.
Wood, Jr., Clifton W., U.S. Reissue Appl. No. 10/693,696, filed Oct. 23, 2003.
International Application No. PCT/US99/02288, International Search Report, Aug. 3, 1999.
Wood, Jr., Clifton W., U.S. Reissue Appl. No. 11/859,360, filed Sep. 21, 2007.
Wood, Jr., Clifton W., U.S. Reissue Appl. No. 12/541,882, filed Aug. 14, 2009.
Wood, Jr., Clifton W., U.S. Reissue Appl. No. 12/493,542, filed Jun. 29, 2009.
USPTO Transaction History of U.S. Appl. No. 09/026,043, filed Feb. 19, 1998, entitled "Method of Addressing Messages and Communications System," now U.S. Pat. No. 6,118,789.
USPTO Transaction History of U.S. Appl. No. 09/026,045, filed Feb. 19, 1998, entitled "Method of Addressing Messages, Methods of Establishing Wireless Communications, and Communications System," now U.S. Pat. No. 6,072,801.

USPTO Transaction History of U.S. Appl. No. 09/026,050, filed Feb. 19, 1998, entitled "Method of Addressing Messages and Communications System," now U.S. Pat. No. 6,061,344.

USPTO Transaction History of U.S. Appl. No. 09/026,248, filed Feb. 19, 1998, entitled "Method of Addressing Messages and Communications System," now U.S. Pat. No. 6,275,476.

USPTO Transaction History of U.S. Appl. No. 09/551,304, filed Apr. 18, 2000, entitled "Method of Addressing Messages and Communications System," now U.S. Pat. No. 6,282,186.

USPTO Transaction History of U.S. Appl. No. 09/556,235, filed Apr. 18, 2000, entitled "Method of Addressing Messages, and Establishing Communications Using a Tree Search Technique That Skips Levels," now U.S. Pat. No. 6,226,300.

USPTO Transaction History of U.S. Appl. No. 09/617,390, filed Jul. 17, 2000, entitled "Method of Addressing Messages and Communications System," now U.S. Pat. No. 6,307,847.

USPTO Transaction History of U.S. Appl. No. 09/773,461, filed Jan. 31, 2001, entitled "Method of Addressing Messages, Methods of Establishing Wireless Communications, and Communications Systems,"now U.S. Pat. No. 6,307,848.

USPTO Transaction History of U.S. Appl. No. 09/820,467, filed Mar. 28, 2001, entitled "Method of Addressing Messages and Communications System," now U.S. Pat. No. 7,315,522.

USPTO Transaction History of U.S. Appl. No. 10/652,573, filed Aug. 28, 2003, entitled "Method of Addressing Messages and Communications System."

USPTO Transaction History of U.S. Appl. No. 10/693,696, filed Oct. 23, 2003, entitled "Method and Apparatus to Select Radio Frequency identification Devices in Accordance with an Arbitration Scheme."

USPTO Transaction History of U.S. Appl. No. 10/693,697, filed Oct. 23, 2003, entitled "Method of Addressing Messages, Methods of Establishing Wireless Communications, and Communications System."

USPTO Transaction History of U.S. Appl. No. 11/143,395, filed Jun. 1, 2005, entitled "Method of Addressing Messages and Communications System."

USPTO Transaction History of U.S. Appl. No. 11/270,204, filed Nov. 8, 2005, entitled "Method of Addressing Messages and Communications System."

USPTO Transaction History of U.S. Appl. No. 11/416,846, filed May 2, 2006, entitled "Method of Addressing Messages and Communications System."

USPTO Transaction History of U.S. Appl. No. 11/855,855, filed Sep. 14, 2007, entitled "Method of Addressing Messages and Communications System."

USPTO Transaction History of U.S. Appl. No. 11/855,860, filed Sep. 14, 2007, entitled "Method of Addressing Messages and Communications System."

USPTO Transaction History of U.S. Appl. No. 11/859,360, filed Sep. 21, 2007, entitled "Method of Addressing Messages and Communications System."

USPTO Transaction History of U.S. Appl. No. 11/862,121, filed Sep. 26, 2007, entitled "Method of Addressing Messages and Communications System."

USPTO Transaction History of U.S. Appl. No. 11/862,124, filed Sep. 26, 2007, entitled "Method of Addressing Messages and Communications System."

USPTO Transaction History of U.S. Appl. No. 11/862,130, filed Sep. 26, 2007, entitled "Method of Addressing Messages and Communications System."

USPTO Transaction History of U.S. Appl. No. 11/865,580, filed Oct. 1, 2007, entitled "Method of Addressing Messages, Methods of Establishing Wirelsee Communications, and Communications System."

USPTO Transaction History of U.S. Appl. No. 11/865,584, filed Oct. 1, 2007, entitled "Method of Addressing Messages, Methods of Establishing Wirelsee Communications, and Communications System."

* cited by examiner

COMMUNICATIONS SYSTEMS FOR RADIO FREQUENCY IDENTIFICATION (RFID)

Matter enclosed in heavy brackets [ ] appears in the original patent but forms no part of this reissue specification; matter printed in italics indicates the additions made by reissue.

CROSS REFERENCE TO RELATED APPLICATION

[This] *More than one reissue has been filed for the reissue of U.S. Pat. No. 6,307,847. The reissue applications are the initial reissue application Ser. No. 10/693,696, filed Oct. 23, 2003, a continuation reissue application Ser. No. 11/859,360, field Sep. 21, 2007, the present continuation resissue application Ser. No. 11/859,364, filed Sep. 21, 2007, and a continuation reissue application Ser. No. 12/493,542,* filed Jun. 29, 2009. The present application is a continuation application of U.S. patent application Ser. No. 10/693,696, filed Oct. 23, 2003, which is a reissue application of U.S. Pat. No. 6,307,847 having U.S. patent application Ser. No. 09/617,390, filed Jul. 17, 2000, which is a [Continuation] *continuation application* of U.S. patent application Ser. No. 09/026,043, filed Feb. 19, 1998, and titled "Method of Addressing Messages and Communications System", now U.S. Pat. No. 6,118,789*, each of which is incorporated by reference*.

TECHNICAL FIELD

This invention relates to communications protocols and to digital data communications. Still more particularly, the invention relates to data communications protocols in mediums such as radio communication or the like. The invention also relates to radio frequency identification devices for inventory control, object monitoring, determining the existence, location or movement of objects, or for remote automated payment.

BACKGROUND OF THE INVENTION

Communications protocols are used in various applications. For example, communications protocols can be used in electronic identification systems. As large numbers of objects are moved in inventory, product manufacturing, and merchandising operations, there is a continuous challenge to accurately monitor the location and flow of objects. Additionally, there is a continuing goal to interrogate the location of objects in an inexpensive an streamlined manner. One way of tracking objects is with an electronic identification system.

One presently available electronic identification system utilizes a magnetic coupling system. In some cases, an identification device may be provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another wireless electronic identification system utilizes a large active transponder device affixed to an object to be monitored which receives a signal from an interrogator. The device receives the signal, then generates and transmits a responsive signal. The interrogation signal and the responsive signal are typically radio-frequency (RF) signals produced by an RF transmitter circuit. Because active devices have their own power sources, and do not need to be in close proximity to an interrogator or reader to receive power via magnetic coupling. Therefore, active transponder devices tend to be more suitable for applications requiring tracking of a tagged device that may not be in close proximity to an interrogator. For example, active transponder devices tend to be more suitable for inventory control or tracking.

Electronic identification systems can also be used for remote payment. For example, when a radio frequency identification device passes an interrogator at a toll booth, the toll booth can determine the identity of the radio frequency identification device, and thus of the owner of the device, and debit an account held by the owner for payment of toll or can receive a credit card number against which the toll can be charged. Similarly, remote payment is possible for a variety of other goods or services.

A communication system typically includes two transponders: a commander station or interrogator, and a responder station or transponder device which replies to the interrogator.

If the interrogator has prior knowledge of the identification number of a device which the interrogator is looking for, it can specify that a response is requested only from the device with that identification number. Sometimes, such information is not available. For example, there are occasions where the interrogator is attempting to determine which of multiple devices are within communication range.

When the interrogator sends a message to a transponder device requesting a reply, there is a possibility that multiple transponder devices will attempt to respond simultaneously, causing a collision, and thus causing an erroneous message to be received by the interrogator. For example, if the interrogator sends out a command requesting that all devices within a communications range identity themselves, and gets a large number of simultaneously replies, the interrogator may not be able to interpret any of these replies. Thus, arbitration schemes are employed to permit communications free of collision.

In one arbitration scheme or system, described in commonly assigned U.S. Pat. Nos. 5,627,544; 5,583,850; 5,500,650; and 5,365,551, all to Snodgrass et al. and all incorporated herein by reference, the interrogator sends a command causing each device of a potentially large number of responding devices to select a random number from a known range and use it as that device's arbitration number. By transmitting requests for identification to various subsets of the full range of arbitration numbers, and checking for an error-free response, the interrogator determines the arbitration number of every responder station capable of communicating at the same time. Therefore, the interrogator is able to conduct subsequent uninterrupted communication with devices, one at a time, by addressing only one device.

Another arbitration scheme is referred to as the Aloha or slotted Aloha scheme. This scheme is discussed in various references relating to communications, such as Digital Communications: Fundamentals and Applications, Bernard Sklar, published January 1988 by Prentice Hall. In this type of scheme, a device will respond to an interrogator using one of many time domain slots selected randomly by the device. A problem with the Aloha scheme is that if there are many devices, or potentially many devices in the field (i.e. in communications range, capable of responding) then there must be many available slots or many collisions will occur. Having many available slots slows down replies. If the magnitude of the number of devices in a field is unknown, then many slots are needed. This results in the system slowing down significantly because the reply time equals the number of slots multiplied by the time period required for one reply.

An electronic identification system which can be used as a radio frequency identification device, arbitration schemes, and various applications for such devices are described in detail in commonly assigned U.S. patent application Ser. No. 08/705,043, filed Aug. 29, 1996, [and] *now U.S. Pat. No. 6,130,602, which is* incorporated herein by reference.

SUMMARY OF THE INVENTION

The invention provides a wireless identification device configured to provide a signal to identify the device in response to an interrogation signal.

One aspect of the invention provides a method of establishing wireless communications between an interrogator and individual ones of multiple wireless identification devices. The method comprises utilizing a tree search method to establish communications without collision between the interrogator and individual ones of the multiple wireless identification devices. A search tree is defined for the tree search method. The tree has multiple levels respectively representing subgroups of the multiple wireless identification devices. The method further comprising starting the tree search at a selectable level of the search tree. In one aspect of the invention, the method further comprises determining the maximum possible number of wireless identification devices that could communicate with the interrogator, and selecting a level of the search tree based on the determined maximum possible number of wireless identification devices that could communicate with the interrogator. In another aspect of the invention, the method further comprises starting the tree search at a level determined by taking the base two logarithm of the determined maximum possible number, wherein the level of the tree containing all subgroups is considered level zero, and lower levels are numbered consecutively.

Another aspect of the invention provides a communications system comprising an interrogator, and a plurality of wireless identification devices configured to communicate with the interrogator in a wireless fashion. The respective wireless identification devices have a unique identification number. The interrogator is configured to employ a tree search technique to determine the unique identification numbers of the different wireless identification so as to be able to establish communications between the interrogator and individual ones of the multiple wireless identification devices without collision by multiple wireless identification devices attempting to respond to the interrogator at the same time. The interrogator is configured to start the tree search at a selectable level of the search tree.

One aspect of the invention provides a radio frequency identification device comprising an integrated circuit including a receiver, a transmitter, and a microprocessor. In one embodiment, the integrated circuit is a monolithic single die single metal layer integrated circuit including the receiver, the transmitter, and the microprocessor. The device of this embodiment includes an active transponder, instead of a transponder which relies on magnetic coupling for power, and therefore has a much greater range.

BRIEF DESCRIPTION OF THE DRAWINGS

Preferred embodiments of the invention are described below with reference to the following accompanying drawings.

FIG. 4 is a diagram illustrating a tree splitting sort method for establishing communication with a radio frequency identification device in a field of a plurality of such devices.

FIG. 5. is a diagram illustrating a modified tree splitting sort method for establishing communication with a radio frequency identification device in a field of a plurality of such devices.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
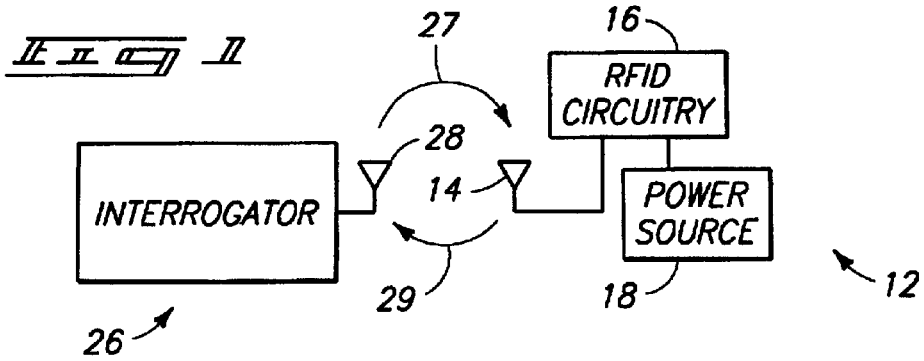
FIG. 1 is a high level circuit schematic showing an interrogator and a radio frequency identification device embodying the invention.

FIG. 1 illustrates a wireless identification device 12 in accordance with one embodiment of the invention. In the illustrated embodiment, the wireless identification device is a radio frequency data communication device 12, and includes RFID circuitry 16. The device 12 further includes at least one antenna 14 connected to the circuitry 16 for wireless or radio frequency transmission and reception by the circuitry 16. In the illustrated embodiment, the RFID circuitry is defined by an integrated circuit as described in the above-incorporated patent application Ser. No. 08/705,043, filed Aug. 29, 1996, *now U.S. Pat. No. 6,130,602*. Other embodiments are possible. A power source or supply 18 is connected to the integrated circuit 16 to supply power to the integrated circuit 16. In one embodiment, the power source 18 comprises a battery.

The device 12 transmits and receives radio frequency communications to and from an interrogator 26. An exemplary integrator is described in commonly assigned U.S. patent application Ser. No. 08/907,689, filed Aug. 8, 1997 [and], *now U.S. Pat. No. 6,289,209, which is* incorporated herein by reference. Preferably, the interrogator 26 includes an antenna 28, as well as dedicated transmitting and receiving circuitry, similar to that implemented on the integrated circuit 16.

Generally, the interrogator 26 transmits an interrogation signal or command 27 via the antenna 28. The device 12 receives the incoming interrogation signal via its antenna 14. Upon receiving the signal 27, the device 12 responds by generating and transmitting a responsive signal or reply 29. The responsive signal 29 typically includes information that uniquely identifies, or labels the particular device 12 that is transmitting, so as to identify any object or person with which the device 12 is associated.

Although only one device 12 is shown in FIG. 1, typically there will be multiple devices 12 that correspond with the interrogator 26, and the particular devices 12 that are in communication with the interrogator 26 will typically change over time. In the illustrated embodiment in FIG. 1, there is no communication between multiple devices 12. Instead, the devices 12 respectively communicate with the interrogator 26. Multiple devices 12 can be used in the same field of an interrogator 26 (i.e., within communications range of an interrogator 26).

The radio frequency data communication device 12 can be included in any appropriate housing or packaging. Various methods of manufacturing housings are described in commonly assigned U.S. patent application Ser. No. 08/800,037, filed Feb. 13, 1997, [and] *now U.S. Pat. No. 5,988,510, which is* incorporated herein by reference.

Figure 2:
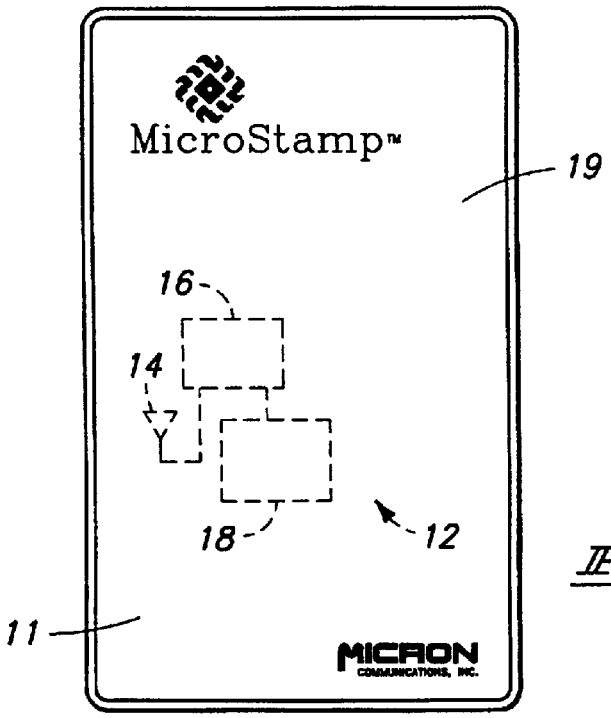
FIG. 2 is a front view of a housing, in the form of a badge or card, supporting the circuit of FIG. 1 according to one embodiment the invention.

FIG. 2 shows but one embodiment in the form of a card or badge 19 including a housing 11 of plastic or other suitable material supporting the device 12 and the power supply 18. In one embodiment, the front face of the badge has visual identification features such as graphics, text, information found on identification or credit cards, etc.

Figure 3:
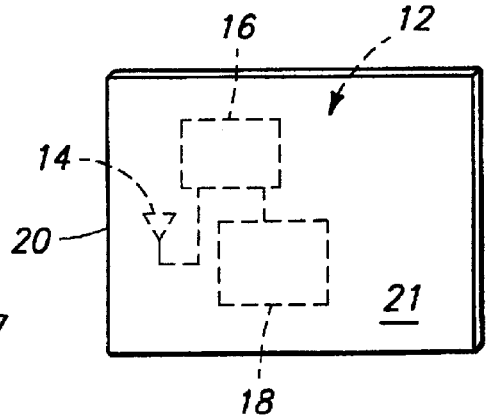
FIG. 3 is a front view of a housing supporting the circuit of FIG. 1 according to another embodiment of the invention.
Figure 2:
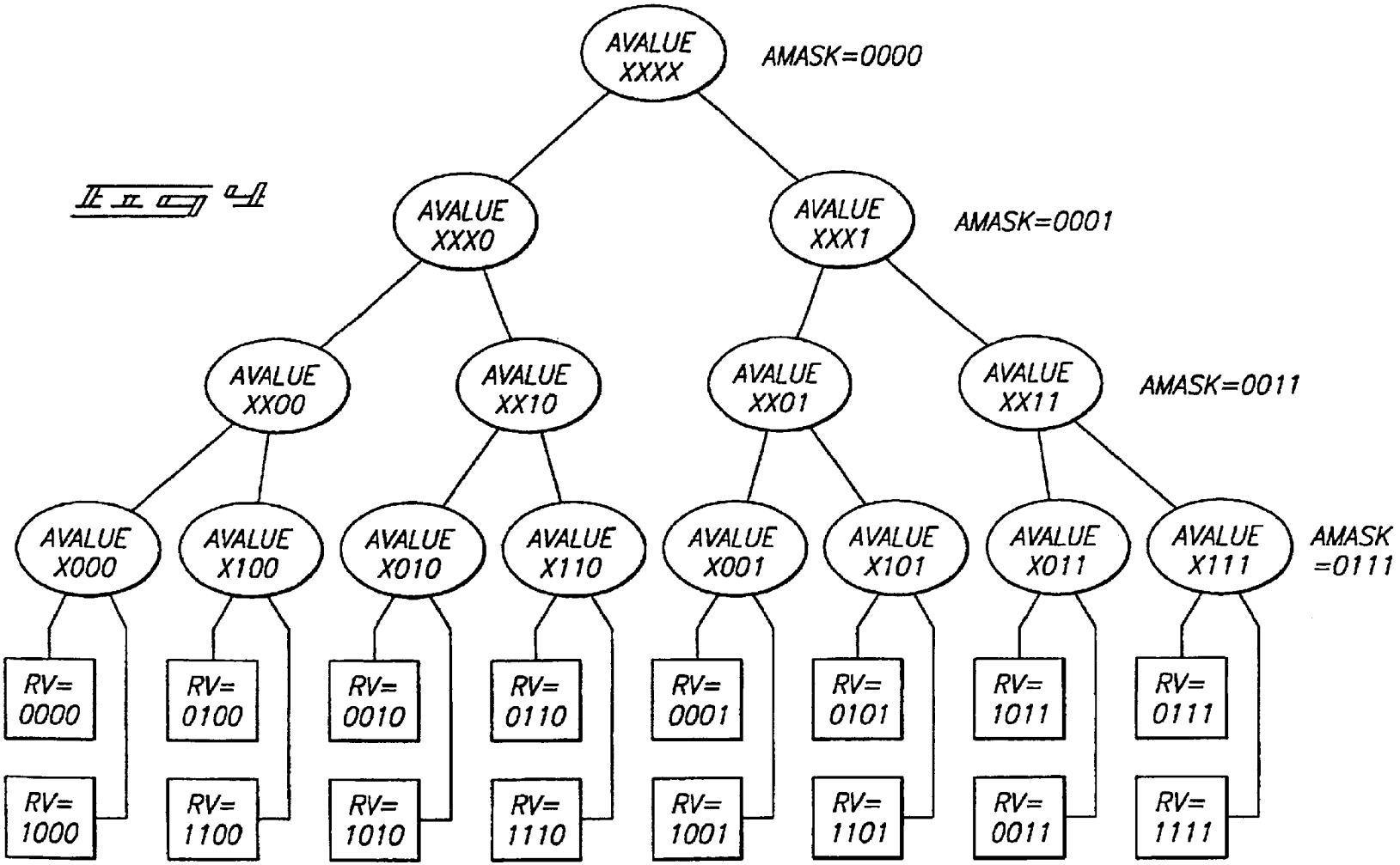
Figure 3:
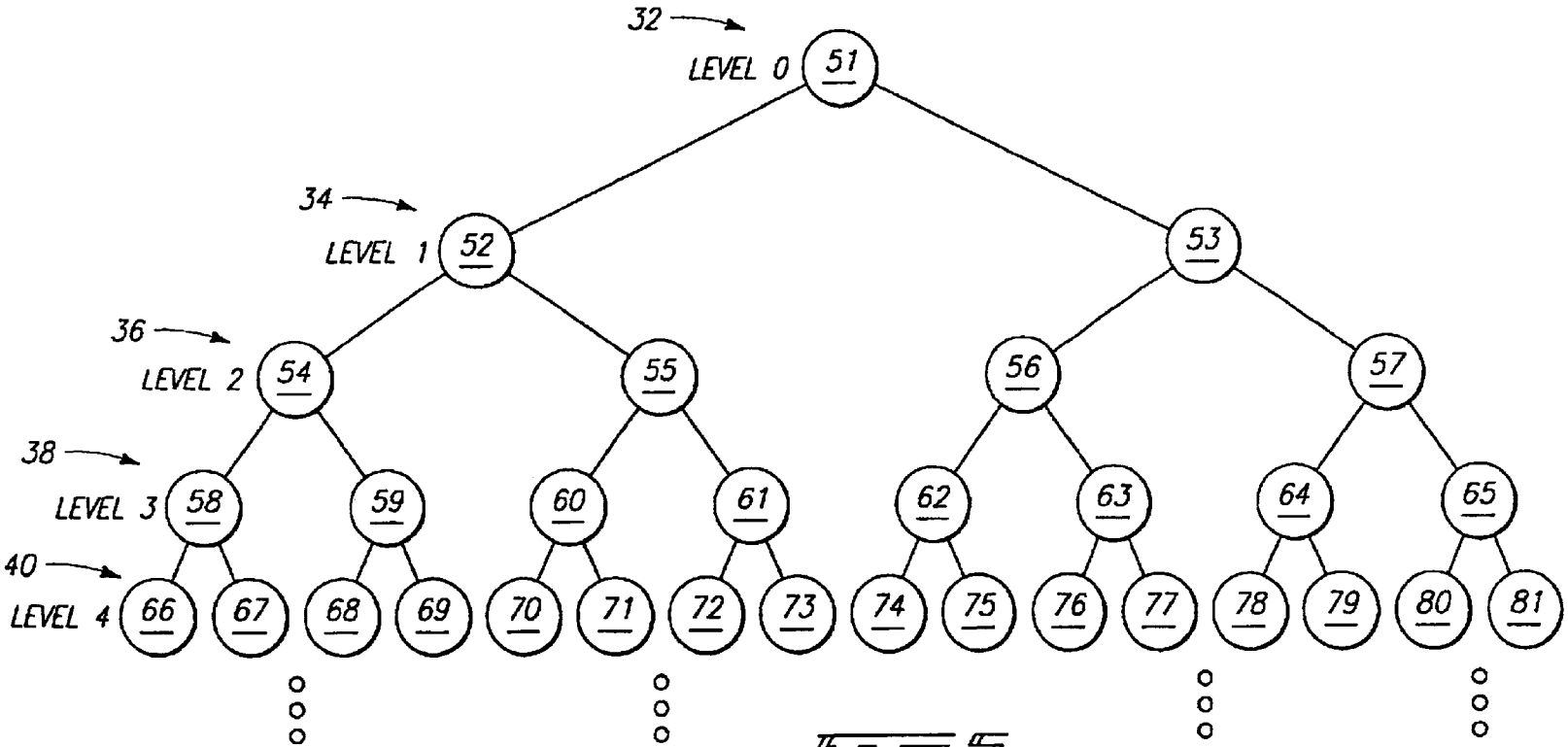

FIG. 3 illustrates but one alternative housing supporting the device 12. More particularly, FIG. 3 shows a miniature housing 20 encasing the device 12 and power supply 18 to define a tag which can be supported by an object (e.g., hung from an object, affixed to an object, etc.). Although two particular types of housings have been disclosed, the device 12 can be included in any appropriate housing.

If the power supply 18 is a battery, the battery can take any suitable form. Preferably, the battery type will be selected depending on weight, size, and life requirements for a particular application. In one embodiment, the battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the power source 18 comprises a series connected pair of button type cells. Instead of using a battery, any suitable power source can be employed.

The circuitry 16 further includes a backscatter transmitter and is configured to provide a responsive signal to the interrogator 26 by radio frequency. More particularly, the circuitry 16 includes a transmitter, a receiver, and memory such as is described in U.S. patent application Ser. No. 08/705,043, *now U.S. Pat. No. 6,130,602*.

Radio frequency identification has emerged as a viable and affordable alternative to tagging or labeling small to large quantities of items. The interrogator 26 communicates with the devices 12 via an electromagnetic link, such as via an RF link (e.g., at microwave frequencies, in one embodiment), so all transmissions by the interrogator 26 are heard simultaneously by all devices 12 within range.

If the interrogator 26 sends out a command requesting that all devices 12 within range identify themselves, and gets a large number of simultaneous replies, the interrogator 26 may not be able to interrupt any of these replies. Therefore, arbitration schemes are provided.

If the interrogator 26 has prior knowledge of the identification number of a device 12 which the interrogator 26 is looking for, it can specify that a response is requested only from the device 12 with that identification number. To target a command at a specific device 12, (i.e., to initiate point-on-point communication), the interrogator 26 must send a number identifying a specific device 12 along with the command. At start-up, or in a new or changing environment, these identification numbers are now known by the interrogator 26. Therefore, the interrogator 26 must identify all devices 12 in the field (within communication range) such as by determining the identification numbers of the devices 12 in the field. After this is accomplished, point-to-point communication can proceed as desired by the interrogator 26.

Generally speaking, RFID systems are a type of multiaccess communication system. The distance between the interrogator 26 and devices 12 within the field is typically fairly short (e.g., several meters), so packet transmission time is determined primarily by packet size and baud rate. Propagation delays are negligible. In such systems, there is a potential for a large number of transmitting devices 12 and there is a need for the interrogator 26 to work in a changing environment, where different devices 12 are swapped in and out frequently (e.g., as inventory is added or removed). In such systems, the inventors have determined that the use of random access methods work effectively for contention resolution (i.e., for dealing with collisions between devices 12 attempting to respond to the interrogator 26 at the same time).

RFID systems have some characteristics that are different from other communications systems. For example, one characteristic of the illustrated RFID systems is that the devices 12 never communicate without being prompted by the interrogator 26. This is in contrast to typical multiaccess systems where the transmitting units operate more independently. In addition, contention for the communication medium is short lived as compared to the ongoing nature of the problem in other multiaccess systems. For example, in a RFID system, after the devices 12 have been identified, the interrogator can communicate with them in a point-to-point fashion. Thus, arbitration in a RFID system is a transient rather than steady-state phenomenon. Further, the capability of a device 12 is limited by practical restriction on size, power, and cost. The lifetime of a device 12 can often be measured in terms of number of transmissions before battery power is lost. Therefore, one of the most important measures of system performance in RFID arbitration is total time required to arbitrate a set of devices 12. Another measure is power consumed by the devices 12 during the process. This is in contrast to the measure of throughout and packet delay in other types of multiaccess systems.

FIG. 4 illustrates one arbitration scheme that can be employed for communication between the interrogator and devices 12. Generally, the interrogator 26 sends a command causing each device 12 of a potentially large number of responding devices 12 to select a random number from a known range and use it as that device's arbitration number. By transmitting requests for identification to various subsets of the full range of arbitration numbers, and checking for an error-free response, the interrogator 26 determines the arbitration number of every responder station capable of communicating at the same time. Therefore, the interrogator 26 is able to conduct subsequent uninterrupted communication with devices 12, one at a time, by addressing only one device 12.

Three variables are used: an arbitration value (AVALUE), an arbitration mask (AMASK), and a random value ID (RV). The interrogator sends an Identify command (IdentifyCmnd) causing each device of a potentially large number of responding devices to select a random number from a known range and use it as that device's arbitration number. The interrogator sends an arbitration value (AVALUE) and an arbitration mask (AMASK) to a set of devices 12. The receiving devices 12 evaluate the following equation: (AMASK & AVALUE)==(AMASK & RV) wherein "&" is a bitwise AND function, and wherein "==" is an equality function. If the equation evaluates to "1" (TRUE), then the device 12 will reply. If the equation evaluates to "0" (FALSE), then the device 12 will not reply. By performing this in a structured manner, with the number of bits in the arbitration mask being increased by one each time, eventually a device 12 will respond with no collisions. Thus, a binary search tree methodology is employed.

An example using actual numbers will now be provided using only four bits, for simplicity, reference being made to FIG. 4. In one embodiment, sixteen bits are used for AVALUE and AMASK. Other numbers of bits can also be employed depending, for example, on the number of devices 12 expected to be encountered in a particular application, on desired cost points. etc.

Assume, for this example, that there are two devices 12 in the field, one with a random value (RV) of 1100 (binary), and another with a random value (RV) of 1010 (binary). The interrogator is trying to establish communications without collisions being caused by the two devices 12 attempting to communicate at the same time.

The interrogator sets AVALUE to 0000 (or "don't care" for all bits, as indicated by the character "X" in FIG. 4) and AMASK to 0000. The interrogator transmits a command to all devices 12 requesting that they identify themselves. Each of the devices 12 evaluate (AMASK & AVALUE)==(AMASK & RV) using the random value RV that the respective devices 12 selected. If the equation evaluates to "1" (TRUE), then the device 12 will reply. If the equation evaluates to "0" (FALSE), then the device 12 will not reply. In the first level of the illustrated tree, AMASK is 0000 and anything bitwise ANDed with all zeros results in all zeros, so both the devices 12 in the field respond, and there is a collision.

Next, the interrogator set AMASK to 0001 and AVALUE to 0000 and transmits an identify command. Both devices 12 in the field have a zero for their least significant bit, and (AMASK & AVALUE)==(AMASK & RV) will be true for both devices 12. For the device 12 with a random value of 1100, the left side of the equation is evaluated as follows (0001 & 0000)==0000. The right side is evaluated as (0001 & 1100)=0000. The left side equals the right side, so the equation is true for the device 12 with the random value of 1100. For the device 12 with a random value of 1010, the left side of the equation is evaluated as (0001 & 0000)=0000. The right side is evaluated as (0001 & 1010)=0000. The left side equals the right side, so the equation is true for the device 12 with the random value of 1010. Because the equation is true for both devices 12 in the field, both devices 12 in the field respond, and there is another collision.

Recursively, the interrogator next sets AMASK to 0011 with AVALUE still at 0000 and transmits an Identity command. (AMASK & AVALUE)==(AMASK & RV) is evaluated for both devices 12. For the device 12 with a random value of 1100, the left side of the equation is evaluated as follows (0011 & 0000)=0000. The right side is evaluated as (0011 & 1100)=0000. The left side equals the right side, so the equation is true for the device 12 with the random value of 1100, so this device 12 responds. For the device 12 with a random value of 1010, the left side of the equation is evaluated as (0011 & 0000)=0010. The right side is evaluated as (0011 & 1010)=0000. The left side does not equal the right side, so the equation is false for the device 12 with the random value of 1010, and this device 12 does not respond. Therefore, there is no collision, and the interrogator can determine the identity (e.g., an identification number) for the device 12 that does respond.

De-recursion takes place, and the device 12 to the right for the same AMASK level are accessed when AVALUE is set at 0010, and AMASK is set to 0011.

The device 12 with the random value of 1010 receives a command and evaluates the equation (AMASK & AVALUE)==(AMASK & RV). The left side of the equation is evaluated as (0011 & 0010)=0010. The right side of the equation is evaluated as (0011 & 1010)=0010. The right side equals the left side, so the equation is true for the device 12 with the random value of 1010. Because there are no other devices 12 in the substrate, a good reply is returned by the device 12 with the random value of 1010. There is no collision, and the interrogator 26 can determine the identity (e.g., an identification number) for the device 12 that does respond.

By recursion, what is meant is that a function makes a call to itself. In other words, the function calls itself within the body of the function. After the called function returns, de-recursion takes place and execution continues at the place just after the function call; i.e. at the beginning of the statement after the function call.

For instance, consider a function that has four statements (numbered 1,2,3,4 ) in it, and the second statement is a recursive call. Assume that the fourth statement is a return statement. The first time through the loop (iteration 1) the function executes the statement 2 and (because it is a recursive call) calls itself causing iteration 2 to occur. When iteration 2 gets to statement 2, it calls itself making iteration 3. During execution in iteration 3 of statement 1, assume that the function does a return. The information that was saved on the stack from iteration 2 is loaded and the function resumes execution at statement 3 (in iteration 2), followed by the execution of statement 4 which is also a return statement. Since there are no more statements in the function, the function de-recurses to iteration 1. Iteration 1, has previously recursively called itself in statement 2. Therefore, it now executes statement 3 (in iteration 1 ). Following that it executes a return at statement 4. Recursion is known in the art.

Consider the following code which can be used to implement operation of the method shown in FIG. 4 and described above.

```
Arbitrate(AMASK, AVALUE)
    {
    collision=IdentifyCmnd(AMASK,AVALUE)
    if (collision) then
                {
                        /* recursive call for left side */
                    Arbitrate((AMASK>>1)+1, AVALUE)
                        /* recursive call for right side */
            Arbitrate((AMASK>>1)+1, AVALUE+(AMASK+1))
        } /* endif */
}/* return */
```

The symbol "<<" represents a bitwise left shift. "<<" means shift left by one place. Thus, 0001<<1 would be 0010. Note, however, that AMASK is originally called with a value of zero, and 0000<<1 is still 0000. Therefore, for the first recursive call, AMASK=(AMASK=(AMASK<<1)+1. So for the first recursive call, the value of AMASK is 0000+0001=0001. For the second call, AMASK=(0001<<)+1=0010+1=0011. For the third recursive call, AMASK=(0011<<1)+1=0110+1=0111.

The routine generates values for AMASK and AVALUE to be used by the interrogator in an identify command "IdentifyCmnd." Note that the routine calls itself if there is a collision. De-recursion occurs when there is no collision. AVALUE and AMASK would have values such as the following assuming collisions take place all the way down to the bottom of the tree.

| AVALUE | AMASK |
|---|---|
| 0000 | 0000 |
| 0000 | 0001 |
| 0000 | 0011 |
| 0000 | 0111 |
| 0000 | 1111* |
| 1000 | 1111* |
| 0100 | 0111 |
| 0100 | 1111* |
| 1100 | 1111* |

This sequence of AMASK, AVALUE binary numbers assumes that there are collisions all the way down to the bottom of the tree, at which point the Identify command sent by the interrogator is finally successful so that no collision occurs. Rows in the table for which the interrogator is successful in receiving a reply without collision are marked with the symbol "*". Note that if the Identify command was successful at, for example, the third line in the table then the interrogator would stop going down that branch of the tree and start down another, so the sequence would be as shown in the following table.

| AVALUE | AMASK |
|---|---|
| 0000 | 0000 |
| 0000 | 0001 |
| 0000 | 0011* |
| 0010 | 0011 |
| . . . | . . . |

This method is referred to as a splitting method. It works by splitting groups of colliding devices 12 into subsets that are resolved in turn. The splitting method can also be viewed as a type of tree search. Each split moves the method one level deeper in the tree.

Either depth-first or breadth-first traversals of the tree can be employed Depth first traversals are performed by using recursion, as is employed in the code listed above. Breadth-first traversals are accomplished by using a queue instead of recursion. The following is an example of code for performing a breadth-first traversal.

```
Arbitrate(AMASK, AVALUE)
    {
    enqueue(0,0)
    while (queue != empty)
        (AMASK, AVALUE) = dequeue( )
        collision=IdentifyCmnd(AMASK,AVALUE)
        if (collision) then
        {
            TEMP = AMASK+1
            NEW__AMASK = (AMASK>>1)+1
            enqueue(NEW__AMASK, AVALUE)
            enqueue(NEW__AMASK, AVALUE+TEMP)
            } /* endif */
    endwhile
    }/* return */
```

The symbol "!=" means not equal to. AVALUE and AMASK would have values such as those indicated in the following table for such code.

| AVALUE | AMASK |
|---|---|
| 0000 | 0000 |
| 0000 | 0001 |
| 0001 | 0001 |
| 0000 | 0011 |
| 0010 | 0011 |
| 0001 | 0011 |
| 0011 | 0011 |
| 0000 | 0111 |
| 0100 | 0111 |
| . . . | . . . |

Rows in the table for which the interrogator is successful in receiving a reply without collision are marked with the symbol "*".

FIG. 5 illustrates an embodiment wherein the interrogator 26 starts the tree search at a selectable level of the search tree. The search tree has a plurality of nodes 51, 52, 53, 54 etc. at respective levels. The size of subgroups of random values decrease in size by half with each node descended. The upper bound of the number of devices 12 in the field (the maximum possible number of devices that could communicate with the interrogator) is determined, and the tree search method is started at a level 32, 34, 36, 38, or 40 in the tree depending on the determined upper bound. In one embodiment, the maximum number of devices 12 potentially capable of responding to the interrogator is determined manually and input into the interrogator 26 via an input device such as a keyboard, graphical user interface, mouse, or other interface. The level of the search tree on which to start the tree search is selected based on the determined maximum possible number of wireless identification devices that could communicate with the interrogator.

The tree search is started at a level determined by taking the base two logarithm of the determined maximum possible number. More particularly, the tree search is started at a level determined by taking the base two logarithm of the power of two nearest the determined maximum possible number of devices 12. The level of the tree containing all subgroups of random values is considered level zero (see FIG. 5), and lower levels are numbered 1, 2, 3, 4, etc. consecutively.

By determining the upper bound of the number of devices 12 in the field, and starting the tree search at an appropriate level, the number of collisions is reduced, the battery life of the devices 12 is increased, and arbitration time is reduced.

For example, for the search tree shown in FIG. 5, if it is known that there are seven devices 12 in the field, starting at node 51 (level 0 ) results in a collision. Starting at level 1 (nodes 52 and 53 ) also results in a collision. The same is true for nodes 54, 55, 56, and 57 in level 2. If there are seven devices 12 in the field, the nearest power of two to seven is the level at which the tree search should be started. $\text{Log}_2$ 8=3, so the tree search should be started at level 3 if there are seven devices 12 in the field.

AVALUE and AMASK would have values such as the following assuming collisions take place from level 3 all the way down to the bottom of the tree.

| AVALUE | AMASK |
|---|---|
| 0000 | 0111 |
| 0000 | 1111* |

-continued

| AVALUE | AMASK |
|---|---|
| 1000 | 1111* |
| 0100 | 0111 |
| 0100 | 1111* |
| 1100 | 1111* |

Rows in the table for which the interrogator is successful in receiving a reply without collision are marked with the symbol "*".

In operation, the interrogator transmits a command requesting devices 12 having random values RV within a specified group of random values to respond, the specified group being chosen in response to the determined maximum number. Devices 12 receiving the command respectively determine if their chosen random values fall within the specified group and, if so, send a reply to the interrogator. The interrogator determines if a collision occurred between devices that sent a reply and, if so, creates a new, smaller, specified group, descending in the tree, as described above in connection with FIG. 4.

Another arbitration method that can be employed is referred to as the "Aloha" method. In the Aloha method, every time a device 12 is involved in a collision, it waits a random period of time before retransmitting. This method can be improved by dividing time into equally sized slots and forcing transmissions to be aligned with one of these slots. This is referred to as "slotted Aloha." In operation, the interrogator asks all devices 12 in the field to transmit their identification numbers in the next time slot. If the response is garbled, the interrogator informs the devices 12 that a collision has occurred, and the slotted Aloha scheme is put into action. This means that each device 12 in the field responds within an arbitrary slot determined by a randomly selected value. In other words, in each successive time slot, the devices 12 decide to transmit their identification number with a certain probability.

The Aloha method is based on a system operated by the University of Hawaii. In 1971, the University of Hawaii began operation of a system named Aloha. A communication satellite was used to interconnect several university computers by use of a random access protocol. The system operates as follows. Users or devices transmit at any time they desire. After transmitting, a user listens for an acknowledgment from the receiver or interrogator. Transmissions from different users will sometimes overlap in time (collide), causing reception errors in the data in each of the contending messages. The errors are detected by the receiver, and the receiver sends a negative acknowledgment to the users. When a negative acknowledgment is received, the messages are retransmitted by the colliding users after a random delay. If the colliding users attempted to retransmit without the random delay, they would collide again. If the user does not receive either an acknowledgment or a negative acknowledgment within a certain amount of time, the user "times out" and retransmits the message.

There is a scheme known as slotted Aloha which improves the Aloha scheme by requiring a small amount of coordination among stations. In the slotted Aloha scheme, a sequence of coordination pulses is broadcast to all stations (devices). As is the case with the pure Aloha scheme, packet lengths are constant. Messages are required to be sent in a slot time between synchronization pulses, and can be started only at the beginning of a time slot. This reduces the rate of collisions because only messages transmitted in the same slot can interfere with one another. The retransmission mode of the pure Aloha scheme is modified for slotted Aloha such that if a negative acknowledgment occurs, the device retransmits after a random delay of an integer number of slot times.

Aloha methods are described in [a] commonly assigned patent application [naming Clifton W. Wood, Jr. as an inventor, U.S. patent application] Ser. No. 09/026,248, filed Feb. 19, 1998, [titled "Method of Addressing Messages and Communications System," filed concurrently herewith, and], *now U.S. Pat. No. 6,275,476, which is* incorporated herein by reference.

In one alternative embodiment, an Aloha method (such as the method described in the commonly assigned patent application mentioned above) is combined with determining the upper bound on a set of devices and staring at a level in the tree depending on the determined upper bound, such as by combining an Aloha method with the method shown and described in connection with FIG. 5. For example, in one embodiment, devices 12 sending a reply to the interrogator 26 do so within a randomly selected time slot of a number of slots.

In another embodiment, levels of the search tree are skipped. Skipping levels in the tree, after a collision caused by multiple devices 12 responding, reduces the number of subsequent collisions without adding significantly to the number of no replies. In real-time systems, it is desirable to have quick arbitration sessions on a set of devices 12 whose unique identification numbers are unknown. Level skipping reduces the number of collisions, both reducing arbitration time and conserving battery life on a set of devices 12. In one embodiment, every other level is skipped. In alternative embodiments, more than one level is skipped each time.

The trade off that must be considered in determining how many (if any) levels to skip with each decent down the tree is as follows. Skipping levels reduces the number of collisions, thus saving battery power in the devices 12. Skipping deeper (skipping more than one level) further reduces the number of collisions. The more levels that are skipped, the greater the reduction in collisions. However, skipping levels results in longer search times because the number of queries (Identify commands) increases. The more levels that are skipped, the longer the search times. Skipping just one level has an almost negligible effect on search time, but drastically reduces the number of collisions. If more than one level is skipped, search time increases substantially. Skipping every other level drastically reduces the number of collisions and saves battery power without significantly increasing the number of queries.

Level skipping methods are described in a commonly assigned patent application 09/026,045 naming Clifton W. Wood, Jr. and Don Hush as inventors, titled "Method of Addressing Messages, Method of Establishing Wireless Communications, and Communications Systems," filed concurrently herewith, now U.S. Pat. No. 6,072,801, and incorporated herein by reference.

In one alternative embodiment, a level skipping method is combined with determining the upper bound on a set of devices and starting at a level in the tree depending on the determined upper bound, such as by combining a level skipping method with the method shown and described in connection with FIG. 5.

In yet another alternative embodiment, both a level skipping method and an Aloha method (as described in the commonly assigned applications described above) are combined with the method shown and described in connection with FIG. 5.

In compliance with the statue, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

[1. A method of establishing wireless communications between an interrogator and individual ones of multiple wireless identification devices, the wireless identification devices having respective identification numbers and being addressable by specifying identification numbers with any one of multiple possible degrees of precision, the method comprising utilizing a tree search in an arbitration scheme to determine a degree of precision necessary to establish one-on-one communications between the interrogator and individual ones of the multiple wireless identification devices, a search tree being defined for the tree search method, the tree having multiple selectable levels respectively representing subgroups of the multiple wireless identification devices, the level at which a tree search starts being variable the method further comprising starting the tree search at any selectable level of the search tree.]

[2. A method in accordance with claim 1 and further comprising determining the maximum possible number of wireless identification devices that could communicate with the interrogator, and selecting a level of the search tree based on the determined maximum possible number of wireless identification devices that could communicate with the interrogator.]

[3. A method in accordance with claim 2 and further comprising starting the tree search at a level determined by taking the base two logarithm of the determined maximum possible number, wherein the level of the tree containing all subgroups is considered level zero, and lower levels are numbered consecutively.]

[4. A method in accordance with claim 2 and further comprising starting the tree search at a level determined by taking the base two logarithm of the determined maximum possible number, wherein the level of the tree containing all subgroups is considered level zero, and lower levels are numbered consecutively, and wherein the maximum number of devices in a subgroup in one level is half of the maximum number of devices in the next higher level.]

[5. A method in accordance with claim 2 and further comprising starting the tree search at a level determined by taking the base two logarithm of the power of two nearest the determined maximum possible number, wherein the level of the tree containing all subgroups is considered level zero, and lower levels are numbered consecutively, and wherein the maximum number of devices in subgroup in one level is half of the maximum number of devices in the next higher level.]

[6. A method in accordance with claim 1 wherein the wireless identification device comprises an integrated circuit including a receiver, a modulator, and a microprocessor in communication with the receiver and modulator.]

[7. A method of addressing messages from an interrogator to a selected one or more of a number of communications devices, the method comprising:

establishing for respective devices unique identification numbers respectively having a first predetermined number of bits;

establishing a second predetermined number of bits to be used for random values;

causing the devices to select random values, wherein respective devices choose random values independently of random values selected by the other devices;

determining the maximum number of devices potentially capable of responding to the interrogator;

transmitting a command from the interrogator requesting devices having random values within a specified group of random values to respond, by using a subset of the second predetermined number of bits, the specified group being chosen in response to the determined maximum number;

receiving the command at multiple devices, devices receiving the command respectively determining if the random value chosen by the device falls within the specified group and, if so, sending a reply to the interrogator; and determining using the interrogator if a collision occurred between devices that sent a reply and, if so, creating a new, smaller, specified group.]

[8. A method of addressing messages from an interrogator to a selected one or more of a number of communications devices in accordance with claim 7 wherein sending a reply to the interrogator comprises transmitting the unique identification number of the device sending the reply.]

[9. A method of addressing messages from an interrogator to a selected one or more of a number of communications devices in accordance with claim 7 wherein sending a reply to the interrogator comprises transmitting the random value of the device sending the reply.]

[10. A method of addressing messages from an interrogator to a selected one or more of a number of communications devices in accordance with claim 7 wherein sending a reply to the interrogator comprises transmitting both the random value of the device sending the reply and the unique identification number of the device sending the reply.]

[11. A method of addressing messages from an interrogator to a selected one or more of a number of communications devices in accordance with claim 7 wherein, after receiving a reply without collision from a device, the interrogator sends a command individually addressed to that device.]

[12. A method of addressing messages from an interrogator to a selected one or more of a number of communications devices, the method comprising:

causing the devices to select random values for use as arbitration numbers, wherein respective devices choose random values independently of random values selected by the other devices, the devices being addressable by specifying arbitration numbers with any one of multiple possible degrees of precision;

transmitting a command from the interrogator requesting devices having random values within a specified group of a plurality of possible groups of random values to respond, the specified group being less than the entire set of random values, the plurality of possible groups being organized in a binary tree defined by a plurality of nodes at respective levels, wherein the size of groups of random values decrease in size by half with each node descended, wherein the specified group is below a node on the tree selected based on the maximum number of devices capable of communicating with the interrogator;

receiving the command at multiple devices, devices receiving the command respectively determining if the random value chosen by the device falls within the specified group and, if so, sending a reply to the interrogator; and, if not, not sending a reply; and determining using the interrogator if a collision occurred between devices that sent a reply and, if so, creating a new, smaller, specified group by descending in the tree.]

[13. A method of addressing messages from an interrogator to a selected one or more of a number of communications devices in accordance with claim 12 and further including establishing a predetermined number of bits to be used for the random values.]

[14. A method of addressing messages from an interrogator to a selected one or more of a number of communications devices in accordance with claim 13 wherein the predetermined number of bits to be used for the random values comprises an integer multiple of eight.]

[15. A method of addressing messages from an interrogator to a selected one or more of a number of communications devices in accordance with claim 13 wherein devices sending a reply to the interrogator do so within a randomly selected time slot of a number of slots.]

[16. A method of addressing messages from an interrogator to a selected one or more of a number of RFID devices, the method comprising:

establishing for respective devices a predetermined number of bits to be used for random values, the predetermined number being a multiple of sixteen;

causing the devices to select random values, wherein respective devices choose random values independently of random values selected by the other devices;

transmitting a command from the interrogator requesting devices having random values within a specified group of a plurality of possible groups of random values to respond, the specified group being equal to or less than the entire set of random values, the plurality of possible groups being organized in a binary tree defined by a plurality of nodes at respective levels, wherein the maximum size of groups of random values decrease in size by half with each node descended, wherein the specified group is below a node on a level of the tree selected based on the maximum number of devices known to be capable of communicating with the interrogator;

receiving the command at multiple devices, devices receiving the command respectively determining if the random value chosen by the device falls within the specified group and, only if so, sending a reply to the interrogator, wherein sending a reply to the interrogator comprises transmitting both the random value of the device sending the reply and the unique identification number of the device sending the reply;

using the interrogator to determine if a collision occurred between devices that sent a reply and, if so, creating a new, smaller, specified group using a level of the tree different from the level used in the interrogator transmitting, the interrogator transmitting a command requesting devices having random values within the new specified group of random values to respond; and if a reply without collision is received from a device, the interrogator subsequently sending a command individually addressed to that device.]

[17. A method of addressing messages from an interrogator to a selected one or more of a number of RFID devices in accordance with claim 16 and further comprising determining the maximum possible number of wireless identification devices that could communicate with the interrogator.]

[18. A method of addressing messages from an interrogator to a selected one or more of a number of RFID devices in accordance with claim 16 wherein selecting the level of the tree comprises taking the base two logarithm of the determined maximum possible number, wherein a level of the tree containing all subgroups is considered level zero, and lower levels are numbered consecutively.]

[19. A method of addressing messages from an interrogator to a selected one or more of a number of RFID devices in accordance with claim 16 wherein selecting the level of the tree comprises taking the base two logarithm of the determined maximum possible number, wherein a level of the tree containing all subgroups is considered level zero, and lower levels are numbered consecutively, and wherein the maximum number of devices in a subgroup in one level is half of the maximum number of devices in the next higher level.]

[20. A method of addressing messages from an interrogator to a selected one or more of a number of RFID devices in accordance with claim 16 wherein selecting the level of the tree comprises taking the base two logarithm of the power of two nearest the determined maximum possible number, wherein the level of the tree containing all subgroups is considered level zero, and lower levels are numbered consecutively, and wherein the maximum number of devices in a subgroup in one level is half of the maximum number of devices in the next higher level.]

[21. A method of addressing messages from an interrogator to a selected one or more of a number of RFID devices in accordance with claim 16 wherein the wireless identification device comprises an integrated circuit including a receiver, a modulator, and a microprocessor in communication with the receiver and modulator.]

[22. A method of addressing messages from an interrogator to a selected one or more of a number of RFID devices in accordance with claim 16 and further comprising, after the interrogator transmits a command requesting devices having random values within the new specified group of random values to respond, determining, using devices receiving the command, if their chosen random values fall within the new smaller specified group and, if so, sending a reply to the interrogator.]

[23. A method of addressing messages from an interrogator to a selected one or more of a number of RFID devices in accordance with claim 22 and further comprising, after the interrogator transmits a command requesting devices having random values within the new specified group of random values to respond, determining if a collision occurred between devices that sent a reply and, if so, creating a new specified group and repeating the transmitting of the command requesting devices having random values within a specified group of random values to respond using different specified groups until all of the devices within communications range are identified.]

[24. A communications system comprising an interrogator, and a plurality of wireless identification devices configured to communicate with the interrogator in a wireless fashion, the wireless identification devices having respective identification numbers, the interrogator being configured to employ a tree search in a search tree having multiple selectable levels, to determine the identification numbers of the different wireless identification devices with sufficient precision so as to be able to establish one-on-one communications between the interrogator and individual ones of the multiple wireless identification devices, wherein the interrogator is configured to start the tree search at any selectable level of the search tree.]

[25. A communications system in accordance with claim 24 wherein the tree search is a binary tree search.]

[26. A communications system in accordance with claim 24 wherein the wireless identification device comprises an integrated circuit including a receiver, a modulator, and a microprocessor in communication with the receiver and modulator.]

[27. A system comprising:

an interrogator;

a number of communications devices capable of wireless communications with the interrogator;

means for establishing a predetermined number of bits to be used as random numbers, and for causing respective devices to select random numbers respectively having the predetermined number of bits;

means for inputting a predetermined number indicative of the maximum number of devices possibly capable of communicating with the receiver;

means for causing the interrogator to transmit a command requesting devices having random values within a specified group of random values to respond, the specified group being chosen in response to the inputted predetermined number;

means for causing devices receiving the command to determine if their chosen random values fall within the specified group and, if so, send a reply to the interrogator; and means for causing the interrogator to determine if a collision occurred between devices that sent a reply and, if so, create a new, smaller, specified group.]

[28. A system in accordance with claim 27 wherein sending a reply to the interrogator comprises transmitting the random value of the device sending the reply.]

[29. A system in accordance with claim 27 wherein the interrogator further includes means for, after receiving a reply without collision from a device, sending a command individually addressed to that device.]

[30. A system comprising:

an interrogator configured to communicate to a selected one or more of a number of communications devices;

a plurality of communications devices;

the devices being configured to select random values, wherein respective devices choose random values independently of random values selected by the other devices, different sized groups of devices being addressable by specifying random values with differing levels of precision;

the interrogator being configured to transmit a command requesting devices having random values within a specified group of a plurality of possible groups of random values to respond, the specified group being less than the entire set of random values, the plurality of possible groups being organized in a binary tree defined by a plurality of nodes at respective levels, wherein the size of groups of random values decrease in size by half with each node descended, wherein the specified group is below a node on the tree selected based on a predetermined maximum number of devices capable of communicating with the interrogator;

devices receiving the command being configured to respectively determine if their chosen random values fall within the specified group and, if so, send a reply to the interrogator; and, if not, not send a reply; and the interrogator being configured to determine if a collision occurred between devices that sent a reply and, if so, create a new, smaller, specified group by descending in the tree.]

[31. A system in accordance with claim 30 wherein the random values respectively have a predetermined number of bits.]

[32. A system in accordance with claim 30 wherein respective devices are configured to store unique identification numbers of a predetermined number of bits.]

[33. A system in accordance with claim 30 wherein respective devices are configured to store unique identification numbers of sixteen bits.]

[34. A system comprising:

an interrogator configured to communicate to a selected one or more of a number of RFID devices;

a plurality of RFID devices, respective devices being configured to store unique identification numbers respectively having a first predetermined number of bits, respective devices being further configured to store a second predetermined number of bits to be used for random values, respective devices being configured to select random values independently of random values selected by the other devices;

the interrogator being configured to transmit an identify command requesting a response from devices having random values within a specified group of a plurality of possible groups or random values, the specified group being less than or equal to the entire set of random values, the plurality of possible groups being organized in a binary tree defined by a plurality of nodes at respective levels, wherein the maximum size of groups of random values decrease in size by half with each node descended, wherein the specified group is below a node on a level of the tree selected based on the maximum number of devices known to be capable of communicating with the interrogator;

devices receiving the command respectively being configured to determine if their chosen random values fall within the specified group and, only if so, send a reply to the interrogator, wherein sending a reply to the interrogator comprises transmitting both the random value of the device sending the reply and the unique identification number of the device sending the reply;

the interrogator being configured to determine if a collision occurred between devices that sent a reply and, if so, create a new, smaller, specified group using a level of the tree different from the level used in previously transmitting an identify command, the interrogator transmitting an identify command requesting devices having random values within the new specified group of random values to respond; and the interrogator being configured to send a command individually addressed to a device after communicating with a device without a collision.]

[35. A system in accordance with claim 34 wherein the interrogator is configured to input and store the predetermined number.]

[36. A system in accordance with claim 34 wherein the devices are configured to respectively determine if their chosen random values fall within a specified group and, if so, send a reply, upon receiving respective identify commands.]

[37. A system in accordance with claim 34 wherein the interrogator is configured to determine if a collision occurred between devices that sent a reply in response to respective identify commands and, if so, create further new specified groups and repeat the transmitting of the identify command requesting devices having random values within a specified group of random values to respond using different specified groups until all responding devices are identified.]

38. A system, comprising:

an interrogator comprising:

one or more antennas, a transmitter and a receiver coupled to the one or more antennas, and a controller coupled to the transmitter and the receiver, the controller to cause the transmitter to transmit, via the one or more antennas, an initial command to select one or more radio frequency identification (RFID) devices from among a potential plurality of RFID devices that are within communications range, the initial command specifying a bit string having multiple bits; and the one or more RFID devices, each respective device of the one or more RFID devices including:

memory to store a respective identification code, a receiver to receive the initial command from the interrogator, a circuit to compare the bit string specified in the initial command against corresponding bits stored in the respective device to determine whether the respective device is a member of a population of RFID devices selected according to the initial command, and if the respective device is a member of the population, pick a respective random value from a range of values to determine a respective slot, and a transmitter to communicate a respective reply, including at least a portion of an identifier of the respective device, to the interrogator in accordance with the respective slot.

39. The system of claim 38, wherein the interrogator is configured to send an acknowledge command in response to the interrogator receiving the respective reply from the respective device and in response to the interrogator determining the respective reply to be collision-free; and the respective reply includes the bit string.

40. The system of claim 38, wherein the respective device is to communicate a respective identification code to identify a person with whom the respective device is associated.

41. The system of claim 38, wherein the interrogator is to further access the respective device individually by sending the identifier to the respective device after receiving the identifier from the respective device.

42. The system of claim 38, wherein the interrogator is to indicate the range of values.

43. The system of claim 38, wherein the identifier comprises a random number generated by the respective device, and the random number is sixteen bits in length.

44. A system comprising:

an interrogator having a transmitter to send an initial command to select one or more radio frequency identification (RFID) devices, the initial command specifying a bit string having multiple bits; and an RFID device comprising:

a device memory to store a plurality of bits, a receiver to receive the initial command, a circuit to, in response to the initial command, determine whether the RFID device is selected via a comparison between the bit string and the plurality of bits stored in the memory and, if the RFID device is determined to be selected, communicate a response in accordance with a slotted anticollision algorithm, and a transmitter to communicate one or more identifiers of the RFID device to the interrogator in accordance with the slotted anticollision algorithm, wherein in accordance with the slotted anticollision algorithm the transmitter is to communicate the one or more identifiers in a time slot with a certain probability.

45. The system of claim 44, wherein the one or more identifiers comprise a sixteen bit random number and the interrogator is configured to send an acknowledge command to the RFID device if the interrogator receives the random number without a collision error.

46. The system of claim 44, wherein the RFID device is further configured to communicate an identification code to the interrogator to identify a person with whom the RFID device is associated.

47. The system of claim 44, wherein the interrogator is further configured to individually address the RFID device using an access command, wherein the access command includes a random number to be included in the one or more identifiers.

48. The system of claim 44, wherein the one or more identifiers comprise both a random number dynamically generated by the RFID device and a static number programmed into the RFID device.

49. The system of claim 44, wherein the transmitter is to further communicate the plurality of bits, along with the one or more identifiers, to the interrogator in accordance with the slotted anticollision algorithm.

50. A system, comprising:

a radio frequency identification (RFID) device disposed in a communication field of an interrogator, the RFID device including:

a receiver to receive a first command from the interrogator after the RFID device is disposed in the field and before the interrogator transmits any other command, the first command specifying a bit string comprising two or more bits, a circuit to, in response to the first command, use the bit string to determine if the RFID device is selected for participation in a slotted anticollision algorithm, and a transmitter to communicate one or more responses to the interrogator in accordance with the slotted anticollision algorithm if the RFID device is determined to be selected for participation in the slotted anticollision algorithm, wherein the one or more responses include at least a portion of a first identifier and at least a portion of a second identifier stored in the RFID device.

51. The system of claim 50, wherein the first identifier comprises a random number dynamically generated by the RFID device for the interrogator to use to individually address the RFID device, and the second identifier is a static number stored in the RFID device.

52. The system of claim 51, wherein the receiver is to further receive from the interrogator an indication of a number of slots from which the RFID device is to randomly select a slot in which to communicate the one or more responses in accordance with the slotted anticollision algorithm.

53. The system of claim 51, wherein the receiver is to further receive from the interrogator an indication of a change in a number of slots in accordance with the slotted anticollision algorithm.

54. The system of claim 51, wherein the RFID device is configured for use in a wireless payment application and further comprises memory storing an identification code to identify a person to be charged for payment.

55. The system of claim 51, wherein the random number is sixteen bits long and the transmitter is to communicate the bit string back to the interrogator with the one or more responses.

*56. The system of claim 51, wherein the RFID device is configured to pick a random value from a range of values and to communicate the one or more responses with a probability corresponding to the random value in accordance with the slotted anticollision algorithm, wherein the first command is to indicate the range of values.*

*57. The system of claim 56, wherein the receiver is to further receive a second command comprising an indication of a change in the range of values.*

*58. The system of claim 51, wherein the transmitter is to communicate the bit string back to the interrogator with the one or more responses.*

*59. The system of claim 50, wherein the RFID device is configured to receive a signal from the interrogator, after the interrogator sends the first command to the RFID device and before the RFID device communicates the one or more responses to the interrogator, wherein the signal indicates the RFID device when to communicate the identifier to the interrogator.*

*60. The system of claim 50, wherein the RFID device communicates the one or more responses via modulating an radio frequency (RF) field provided by the interrogator.*

*61. The system of claim 50, wherein the transmitter is to communicate the bit string back to the interrogator with the one or more responses.*

*62. The system of claim 50, wherein the RFID device is configured for use in a wireless payment system and further comprises memory storing an identification code to identify a person to be charged for payment.*

*63. The system of claim 50, wherein the RFID device is configured to randomly pick an integer from a number of integers and to communicate the one or more responses in a first slot with a probability corresponding to the randomly picked integer in accordance with the slotted anticollision algorithm, wherein the first command is to indicate the number of integers.*

*64. The system of claim 63, wherein the receiver is to further receive from the interrogator a second command, the second command to indicate a different number of integers for the RFID device to use in accordance with the slotted anticollision algorithm.*

*65. A system comprising:*

*an interrogator including:*

*at least one antenna to provide a radio frequency (RF) field, a plurality of radio frequency identification (RFID) devices to modulate the RF field to transmit responses to the interrogator;*

*a transmitter to send a first signal after the plurality of RFID devices are disposed in the field and before any of the plurality of RFID devices transmit responses to the interrogator, the first signal including a bit string comprising multiple bits; and*

*a receiver to receive responses to the first signal in accordance with a slotted anticollision algorithm;*

*wherein the plurality of RFID devices include:*

*a first RFID device configured to store a first set of bits,*

*receive the first signal and determine if the first RFID device is selected by the interrogator, including comparing the bit string with the first set of bits, and if so,*

*pick a first random integer from a variable range of random integers and associate the first random integer with a first time slot in accordance with the anticollision algorithm, and*

*modulate the RF field to communicate a first identification code of the first RFID device during the first time slot; and*

*a second RFID device to*

*store a second set of bits,*

*receive the first signal and determine if the second device is selected by the interrogator, including comparing the bit string with the second set of bits, and if so,*

*pick a second random integer from a variable range of random integers and associate the second random integer with a second time slot in accordance with the anticollision algorithm, and*

*modulate the RF field to communicate a second identification code of the second RFID device during the second time slot.*

*66. The system of claim 65, wherein the first identification code includes a first random number generated by the first RFID device; and the second identification code includes a second random number generated by the second RFID device.*

*67. The system of claim 66, wherein the interrogator is configured to receive the first random number from the first RFID device during a period of time associated with the first slot and, in response thereto, to send a first acknowledge signal to acknowledge the first RFID device; and the interrogator is configured to receive the second random number from the second RFID device during a period of time associated with the second slot and, in response thereto, to send a second acknowledge signal to acknowledge the second RFID device.*

*68. The system of claim 66, wherein after receiving the first random number and the first identification code from the first RFID device, the interrogator is to send a command that includes the first random number to individually identify the first RFID device.*

*69. The system of claim 68, wherein the interrogator is configured to receive a first identifier from the first RFID device to identify a person with whom the first RFID device is associated and to receive a second identifier from the second RFID device to identify a person with whom the second RFID device is associated.*

*70. The system of claim 69, wherein the interrogator is configured to send a second signal after sending the first signal; and wherein the first RFID device is configured to communicate the first identification code in response to receiving the second signal.*

*71. The system of claim 65, wherein the interrogator is configured to send a first acknowledge signal to acknowledge the first RFID device and a second acknowledge signal to acknowledge the second RFID device.*

*72. A system comprising:*

*an interrogator including:*

*an antenna to provide a radio frequency (RF) field to interrogate;*

*a transmitter to send an initial command to identify radio frequency identification (RFID) devices disposed in the field, the initial command to be sent after the RFID devices are disposed in the field and before any of the RFID devices communicate any responses to the interrogator, the initial command to include a first specifying a plurality of bit values to select one or more of the RFID devices to participate in a slotted anticollision algorithm; and*

*a receiver to receive responses to the initial command in accordance with the slotted anticollision algorithm; and*

*an RFID device disposed in the RF field of the interrogator, the RFID device comprising:*

*a receiver to wirelessly receive the initial command;*

*a random number generator to randomly select an integer value from a range of integer values in accordance with the slotted anticollision algorithm, the range to be adjustable and to be indicated to the RFID device by the interrogator; and*

*a transmitter to modulate the RF field to communicate a one or more responses to the interrogator based at least in part on whether the plurality of bit values received from the interrogator identify the RFID device for response, wherein the one or more responses are to include a first identifier and are to be communicated in accordance with the randomly selected integer value in accordance with the slotted anticollision algorithm.*

*73. The system of claim 72, wherein the RFID device is configured to communicate at least a portion of an identification code to the interrogator, wherein the identification code identifies a person with whom the RFID device is associated.*

*74. The system of claim 72, wherein the one or more responses are to further include a second identifier to be communicated in accordance with the randomly selected integer value in accordance with the slotted anticollision algorithm.*

*75. The system of claim 74, wherein the first identifier comprises a random number generated by the RFID device; and the second identifier comprises a static code programmed into the RFID device.*

*76. The system of claim 72, wherein the RFID device is to compare the plurality of bit values to at least a portion of a number stored in the RFID device to determine whether the plurality of bit values received from the interrogator identify the RFID device for response, wherein the one or more responses to the interrogator are to include the number as a second identifier from the RFID device; and wherein the interrogator is configured to send a subsequent command specifically addressed to the RFID device using the identifier.*

*77. The system of claim 76, wherein the RFID device is to communicate the one or more responses in a first slot in accordance with the slotted anticollision algorithm with a first probability corresponding to the integer value.*

*78. The system of claim 72, wherein the range is to be indicated to the RFID device by the initial command, and a different range is to be indicated to the RFID device by a subsequent command, wherein the subsequent command includes a field re-specifying the plurality of bit values to select one or more of the RFID devices.*

* * * * *

US00RE41531C1

(12) EX PARTE REEXAMINATION CERTIFICATE (10248th)

United States Patent

Wood, Jr.

(10) Number: US RE41,531 C1

(45) **Certificate Issued: *Aug. 8, 2014**

(54) COMMUNICATIONS SYSTEMS FOR RADIO FREQUENCY IDENTIFICATION (RFID)

(75) Inventor: Clifton W. Wood, Jr., Tulsa, OK (US)

(73) Assignee: Round Rock Research, LLC, Mt. Kisco, NY (US)

Reexamination Request:
No. 90/012,114, Jan. 30, 2012

Reexamination Certificate for:

| | |
|---|---|
| Patent No.: | **Re. 41,531** |
| Issued: | **Aug. 17, 2010** |
| Appl. No.: | **11/859,364** |
| Filed: | **Sep. 21, 2007** |

( * ) Notice: This patent is subject to a terminal disclaimer.

Related U.S. Patent Documents

Reissue of:

| | |
|---|---|
| (64) Patent No.: | **6,307,847** |
| Issued: | **Oct. 23, 2001** |
| Appl. No.: | **09/617,390** |
| Filed: | **Jul. 17, 2000** |

Related U.S. Application Data

(63) Continuation of application No. 10/693,697, filed on Oct. 23, 2003, now Pat. No. Re. 42,344, which is an application for the reissue of Pat. No. 6,307,847, which is a continuation of application No. 09/026,043, filed on Feb. 19, 1998, now Pat. No. 6,118,789.

(51) Int. Cl.
*H04W 4/00* (2009.01)

(52) U.S. Cl.
USPC ..... 370/329; 370/345; 370/347

(58) Field of Classification Search
None
See application file for complete search history.

(56) References Cited

To view the complete listing of prior art documents cited during the proceeding for Reexamination Control Number 90/012,114, please refer to the USPTO's public Patent Application Information Retrieval (PAIR) system under the Display References tab.

*Primary Examiner* — Michael J. Yigdall

(57) ABSTRACT

A system for establishing wireless communications between an interrogator and individual ones of multiple wireless identification devices The interrogator transmits a first request comprising a bit string comprising a plurality of bits for use in selecting one or more wireless identification devices to participate in a slotted anticollision algorithm. Wireless identification devices in a field of the interrogator use the bit string to determine whether or not they are selected for participation. Those wireless identification devices that are selected for participation respond to the interrogator in a slot with a certain probability in accordance with the slotted anticollision algorithm.

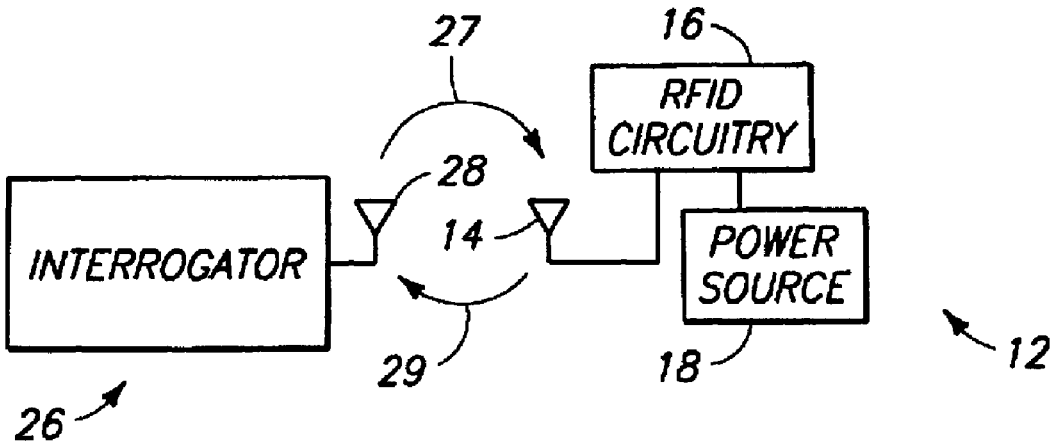

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 38, 44, 50, 65 and 72 are cancelled.

Claims 39-43, 45-49, 51-64, 66-71 and 73-78 were not reexamined.

* * * * *